(12) United States Patent
Arimune et al.

(10) Patent No.: US 9,199,693 B2
(45) Date of Patent: Dec. 1, 2015

(54) DRIVING UNIT AND BATTERY-ASSISTED BICYCLE

(71) Applicant: YAMAHA HATSUDOKI KABUSHIKI KAISHA, Iwata-shi, Shizuoka (JP)

(72) Inventors: Nobuyasu Arimune, Shizuoka (JP); Satoshi Kamiya, Shizuoka (JP); Masanori Negoro, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/107,012

(22) Filed: Dec. 16, 2013

(65) Prior Publication Data
US 2014/0166386 A1 Jun. 19, 2014

(30) Foreign Application Priority Data
Dec. 17, 2012 (JP) ................................. 2012-275150

(51) Int. Cl.
*B62M 6/40* (2010.01)
*B62M 6/45* (2010.01)
*B62M 6/50* (2010.01)
*B62M 6/55* (2010.01)

(52) U.S. Cl.
CPC . *B62M 6/50* (2013.01); *B62M 6/45* (2013.01); *B62M 6/40* (2013.01); *B62M 6/55* (2013.01)

(58) Field of Classification Search
CPC ............ B62M 6/00; B62M 6/10; B62M 6/15; B62M 6/20; B62M 6/40; B62M 6/45; B62M 6/50; B62M 6/55

USPC .................................... 180/220, 65.1; 701/22
See application file for complete search history.

(56) References Cited

U.S. PATENT DOCUMENTS

| 5,370,200 | A | * | 12/1994 | Takata | 180/206.4 |
| 5,806,621 | A | * | 9/1998 | Soda et al. | 180/206.4 |
| 5,857,537 | A | | 1/1999 | Matsumoto et al. | |
| 5,922,035 | A | * | 7/1999 | Chen | 701/22 |
| 8,689,921 | B2 | * | 4/2014 | Aoki et al. | 180/206.1 |
| 2012/0083957 | A1 | * | 4/2012 | Aoki et al. | 701/22 |
| 2012/0247853 | A1 | * | 10/2012 | Hashimoto et al. | 180/206.3 |

FOREIGN PATENT DOCUMENTS

| CN | 1113473 A | 12/1995 |
| CN | 102730145 A | 10/2012 |
| EP | 0 675 037 A1 | 10/1995 |
| EP | 2 436 590 A1 | 4/2012 |
| EP | 2 505 477 A1 | 10/2012 |
| JP | 3108311 B2 | 11/2000 |
| JP | 2012-162174 A | 8/2012 |

* cited by examiner

OTHER PUBLICATIONS

Official Communication issued in corresponding European Patent Application No. 13197312.5, mailed on Apr. 1, 2014.

*Primary Examiner* — Joseph Rocca
*Assistant Examiner* — Marc A Scharich
(74) *Attorney, Agent, or Firm* — Keating and Bennett, LLP

(57) ABSTRACT

A driving unit and a battery-assisted bicycle include a stopping assist control without making a rider feel uncomfortable. The driving unit includes a crankshaft to which pedals are to be connected, a torque detector that detects a torque generated at the crankshaft, and an assist control stopping unit that stops an assist control based on an amplitude of a torque detected by the torque detector while the crankshaft rotates in a prescribed rotation angle range.

8 Claims, 8 Drawing Sheets

DRIVING UNIT AND BATTERY-ASSISTED BICYCLE

BACKGROUND OF THE INVENTION

1. Field of the Invention

The present invention relates to a driving unit and a battery-assisted bicycle that assists a rider's pedaling effort with a driving force from an electric motor.

2. Description of the Related Art

There has been a known battery-assisted bicycle that detects a torque generated at a crankshaft rotated together with pedals by a torque detector and controls an electric motor based on a detection result in order to assist the rider's pedaling effort. In such a battery-assisted bicycle as disclosed in Japanese Patent No. 3108311, a fluctuation range of torque is detected and if the fluctuation range continues to be less than a prescribed range at least for a prescribed time period, an assist control is stopped.

In the structure disclosed in Japanese Patent No. 3108311, if the prescribed time period used as a criterion to stop the assist control is too short, the criterion is intermittently satisfied while the bicycle travels with a low crank rotation speed and the assist control can be suspended frequently. On the other hand, if the prescribed time period is too long, the time after a rider pushes on the pedals until the assist stops is prolonged.

As described above, if assistance is stopped based on the duration of a prescribed state as disclosed in Japanese Patent 3108311, the assist control may be suspended intermittently or the timing to stop the control considerably varies depending on the length of the prescribed time period used as the criterion to stop the assist control. Therefore, the structure may make a rider feel uncomfortable.

SUMMARY OF THE INVENTION

A preferred embodiment of the present invention provides a driving unit and a battery-assisted bicycle that stop the assist control without making a rider feel uncomfortable.

The driving unit according to a preferred embodiment of the present invention assists the rider's pedaling effort by providing a driving force from an electric motor. The driving unit includes a crankshaft to which pedals are to be connected, a torque detector that detects a torque generated at the crankshaft, a torque amplitude calculator that obtains an amplitude of a torque detected by the torque detector while the crankshaft rotates in a prescribed rotation angle range, and an assist control stopping unit that stops an assist control if the amplitude of the torque detected by the torque amplitude calculator is not more than a predetermined threshold.

The driving unit according to a preferred embodiment stops the assist control accurately without making a rider feel uncomfortable in any traveling state.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Now, preferred embodiments of the present invention will be described in conjunction with the accompanying drawings, in which the components shown are not drawn to scale.

In the following description, the front, back, left, and right refer to these directions as viewed from a rider seated on a seat 24 of a battery-assisted bicycle 1 and holding a handle 23.

Figure 1:
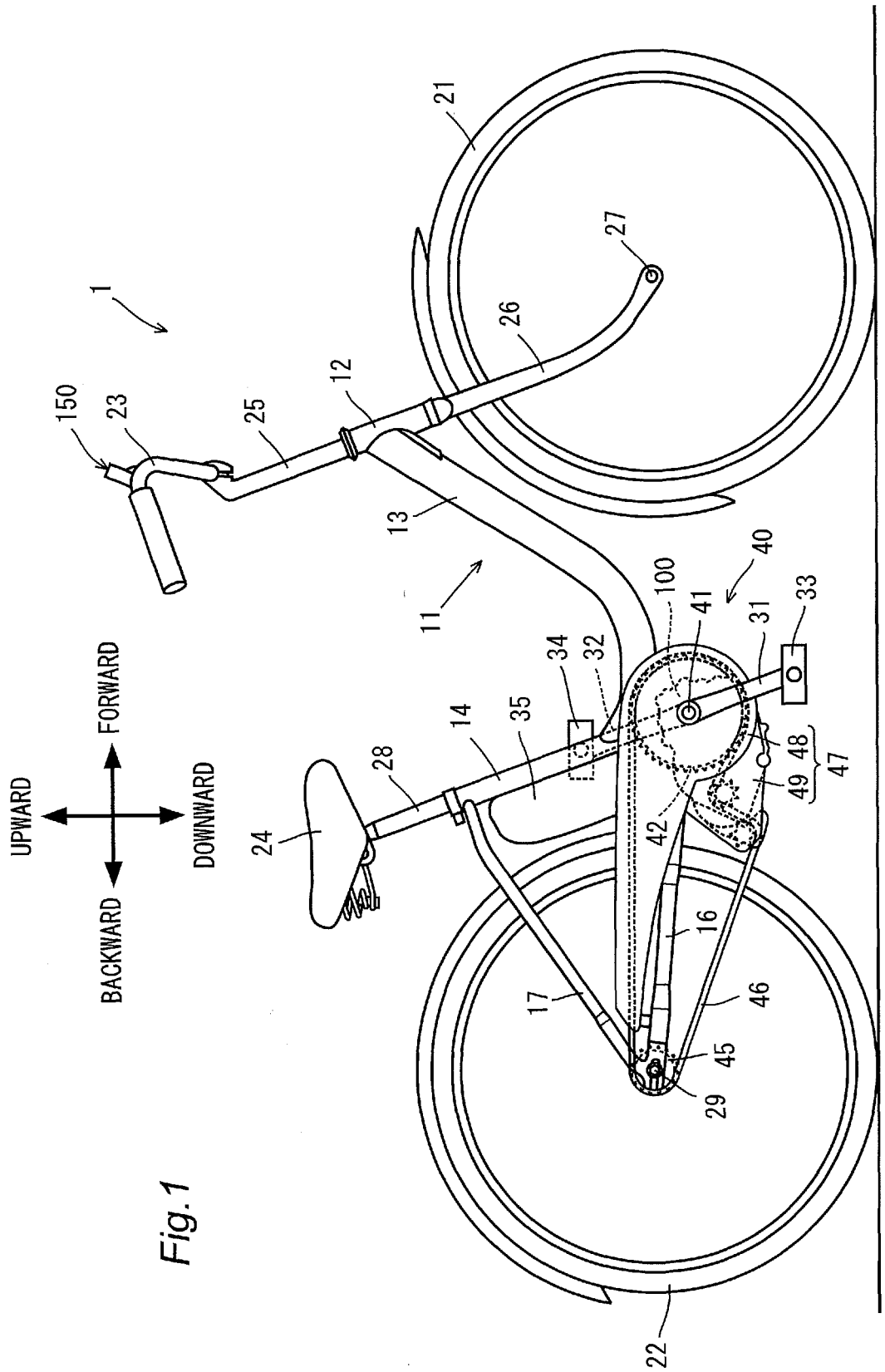
FIG. 1 is a right side view of a general structure of a battery-assisted bicycle.
Figure 2:
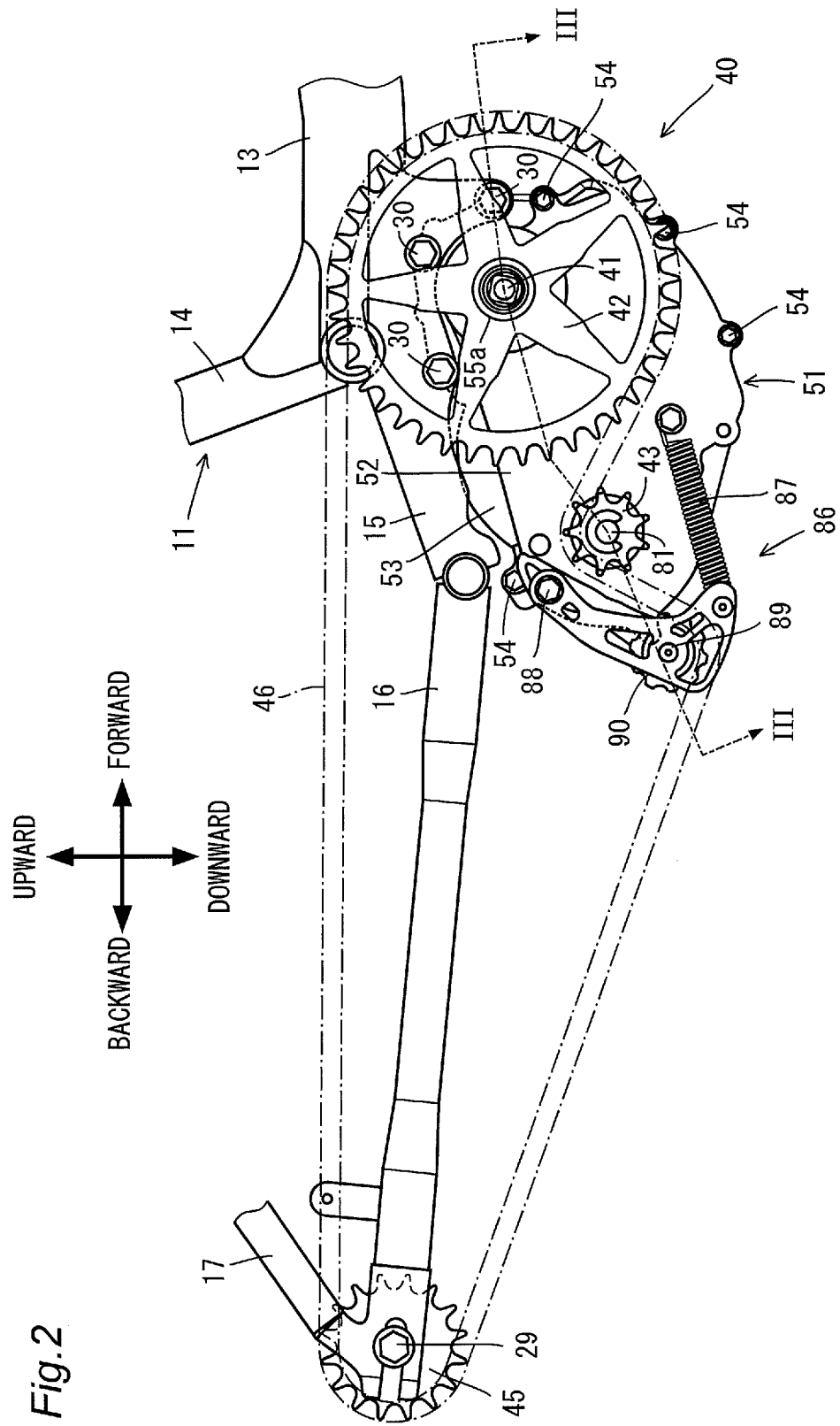
FIG. 2 is a view of a general structure of a driving unit and a driven sprocket in the battery-assisted bicycle.

FIG. 1 shows a general structure of a battery-assisted bicycle 1 according to a preferred embodiment of the present invention. FIG. 2 shows a general structure of a driving unit 40 and a driven sprocket 45 of the battery-assisted bicycle 1. As will be described, in this battery-assisted bicycle 1, pedaling effort obtained as a rider pushes on pedals 33 and 34 (see FIG. 1) is assisted by providing a driving force output from an electric motor 61 (see FIG. 3). More specifically, the battery-assisted bicycle 1 includes a driving mechanism arranged to assist the pedaling effort in addition to a general structure as a bicycle.

As shown in FIG. 1, the battery-assisted bicycle 1 includes a vehicle body frame 11 that extends in a front-back direction. The battery-assisted bicycle 1 includes a front wheel 21, a rear wheel 22, the handle 23, the seat 24, and the driving unit 40.

The vehicle body frame 11 includes a head pipe 12, a down frame 13, a seat frame 14, a bracket 15 (see FIG. 2), a pair of chain stays 16, and a pair of seat stays 17. As shown in FIG. 1, the head pipe 12 is provided at a front portion of the battery-assisted bicycle 1. The head pipe 12 is connected with a front side of the down frame 13 that extends rearward. The seat frame 14 is connected to a rear side of the down frame 13 and extends upward and obliquely rearward from a rear end of the down frame 13.

As shown in FIG. 2, the bracket 15 is attached to the rear side of the down frame 13. The pair of chain stays 16 is connected to a rear side of the bracket 15 as the stays hold the rear wheel 22 between them in a left-right direction. As shown in FIG. 1, the seat stays 17 each have one end connected to one of the chain stays 16. The seat stays 17 have their other ends connected to the seat frame 14.

The head pipe 12 includes a handle stem 25 rotatably inserted therein. The handle 23 is fixed at an upper end of the handle stem 25. A front fork 26 is fixed to a lower end of the handle stem 25. The front wheel 21 is supported rotatably by an axle 27 at a lower end of the front fork 26.

A seat pipe 28 is inserted inside the cylindrical seat frame 14. The seat 24 is provided at an upper end of the seat pipe 28.

As shown in FIGS. 1 and 2, the rear wheel 22 is rotatably supported by an axle 29 at rear ends of the pair of chain stays 16. The driven sprocket 45 is provided coaxially with the axle 29 on the right side of the rear wheel 22. The driven sprocket 45 is coupled to the rear wheel 22 through a one-way clutch 92 (see FIG. 4).

As shown in FIG. 2, the driving unit 40 is fixed to the bracket 15 by a plurality of metal fasters 30. The structure of the driving unit 40 will be described. As shown in FIGS. 1 and 2, an endless chain 46 is wound around a driving sprocket 42 (that will be described) of the driving unit 40 and the driven sprocket 45 provided at the rear wheel 22. A chain cover 47 is attached to the vehicle body frame 11 to cover the driving unit 40 and the chain 46 (see FIG. 1). The chain cover 47 includes a main cover 48 and a sub cover 49. The main cover 48 covers a right portion of the driving sprocket 42 and extends in the front-back direction. The sub cover 49 covers a rear right portion of the driving unit 40.

As shown in FIG. 1, crank arms 31 and 32 are attached to both ends of the crankshaft 41 of the driving unit 40 that will be described. The crank arms 31 and 32 are attached with pedals 33 and 34, respectively, at their tip ends.

As shown in FIG. 1, a battery unit 35 used to supply electric power to the electric motor 61 of the driving unit 40 that will be described is provided behind the seat frame 14. The battery unit 35 includes a battery and a battery controller that are not shown. The battery is a chargeable/dischargeable battery. The battery controller controls charge/discharge to/from the battery and also monitors the output current and remaining capacity of the battery.

Figure 3:
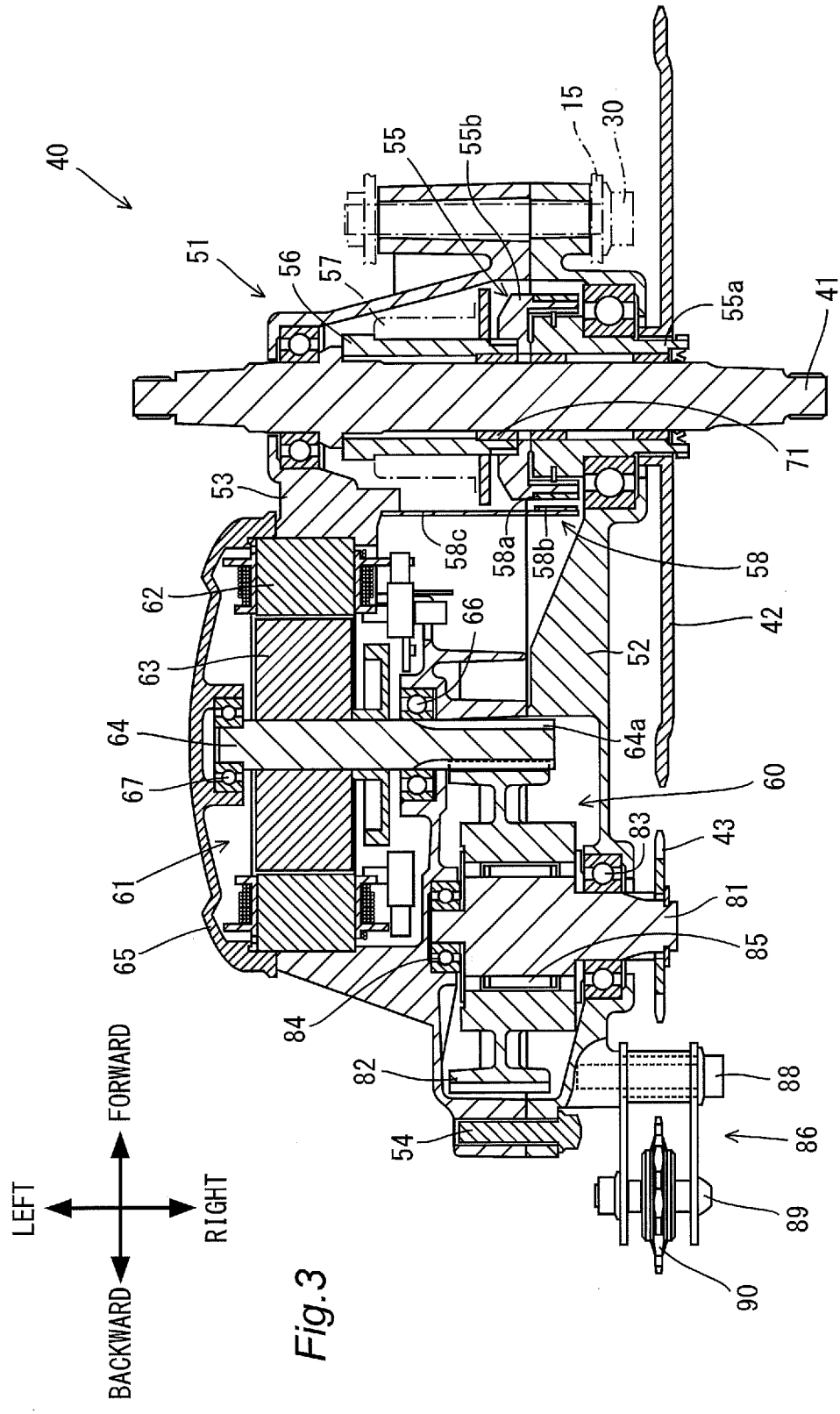
FIG. 3 is a sectional view taken along line III-III in FIG. 2.

FIG. 3 is a sectional view of a general structure of the driving unit 40. FIG. 3 is a sectional view taken along line III-III in FIG. 2.

Figure 4:
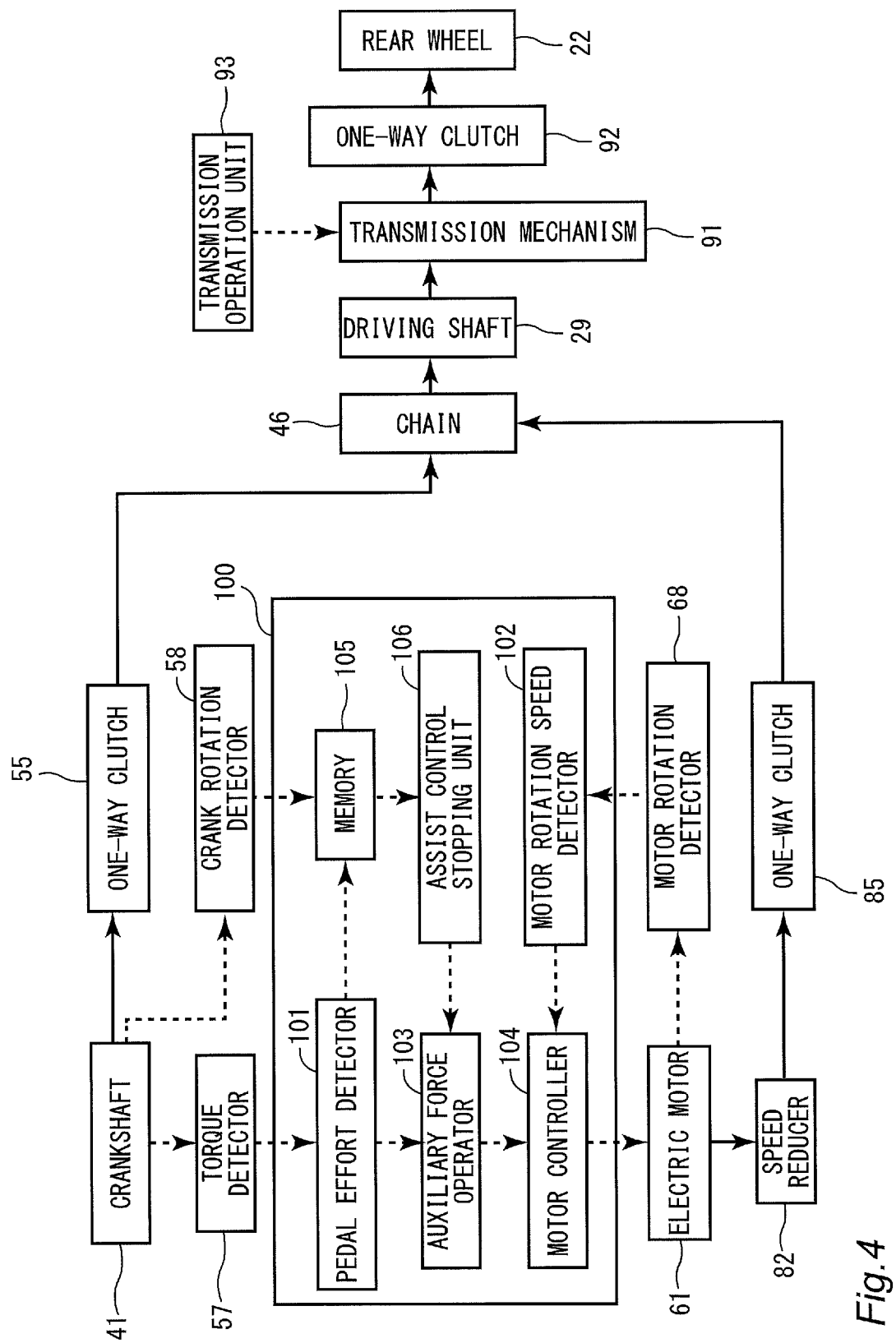
FIG. 4 is a schematic block diagram of motive power transmission and signal transmission paths in the battery-assisted bicycle.

As shown in FIG. 3, the driving unit 40 includes a main body 51, the crankshaft 41, the driving sprocket 42, a driving force generator 60, an auxiliary sprocket 43, a chain tensioner 86, and a controller 100 (see FIGS. 1 and 4).

The main body 51 includes a first case portion 52 and a second case portion 53 assembled with each other in the left-right direction. The first and second case portions 52 and 53 are fixed to each other by a plurality of metal fasteners 54 (see FIGS. 2 and 3). The main body 51 is attached to the bracket 15 by the metal fasteners 30.

As shown in FIG. 3, the crankshaft 41 extends through the main body 51 in the left-right direction and is supported rotatably at a front end of the main body 51. The crankshaft 41 is supported rotatably by the first and second case portions 52 and 53 through a plurality of bearings. A substantially cylindrical inner member 55a that rotates together with the crankshaft 41 is provided on one side of the crankshaft 41. As described above, the crank arms 31 and 32 are connected to both ends of the crankshaft 41, so that the crankshaft 41 rotates as a rider pushes on the pedals 33 and 34.

The driving sprocket 42 is attached to a right end of the outer circumferential surface of the inner member 55a. The crankshaft 41, the inner member 55a, and the driving sprocket 42 are provided coaxially to one another.

A substantially cylindrical rotation member 56 is provided coaxially with the crankshaft 41 at an axially central portion of the crankshaft 41. A right end of the rotation member 56 is supported at the crankshaft 41 through a cylindrical slider bearing 71. A left end of the rotation member 56 is connected to the crankshaft 41, for example, by a spline mechanism. In this manner, the rotation member 56 rotates together with the crankshaft 41.

A torque detector 57 is provided coaxially with the rotation member 56. An example of the torque detector 57 includes a magneto-strictive torque sensor. When the torque detector 57 is a magneto-strictive type torque sensor, the torque detector 57 includes a coil provided opposed to an outer circumferential surface of the rotation member 56. The torque detector 57 including such a structure detects a distortion of the rotation member 56 as a voltage change across the coil in order to detect a torque at the crankshaft 41. The torque detector 57 outputs a signal based on the detected torque to the controller 100 (FIG. 4) that will be described. The controller 100 controls the electric motor 61 (that will be described) based on the signal output from the torque detector 57. Note that the torque detector 57 may have a structure other than that of the magneto-strictive torque sensor as far as the structure is capable of detecting a torque.

A one-way clutch (crank side one-way clutch) 55 includes a substantially cylindrical outer member 55b provided coaxially with the crankshaft 41 so as to couple the rotation member 56 and the inner member 55a. A left end of the outer member 55b and a right end of the rotation member 56 are connected, for example, by a spline mechanism. In this manner, the outer member 55b rotates together with the rotation member 56.

A right end of the outer member 55b and a left end of the inner member 55a are connected, for example, by a latch mechanism so that only a rotation force in one direction is transmitted from the outer member 55b to the inner member 55a. In this manner, a rotation force in a forward turning direction (clockwise as viewed from the right) is transmitted from the outer member 55b to the inner member 55a. However, a rotation force in a backward turning direction (anti-clockwise as viewed from the right) is not transmitted from the outer member 55b to the inner member 55a.

This structure allows a rider's pedaling effort to be transmitted from the crankshaft 41 to the inner member 55a through the rotation member 56 and the outer member 55b when the rider pushes on the pedals 33 and 34 and rotate the crankshaft 41 to propel the battery-assisted bicycle 1. Therefore, the inner member 55a and the driving sprocket 42 are turned forward. On the other hand, when the rider turns the crankshaft 41 backward, the rotation is not transmitted from the outer member 55b to the inner member 55a. Therefore, the inner member 55a and the driving sprocket 42 are not turned backward.

As shown in FIG. 3, a substantially cylindrical magnet 58a is provided on an outer circumferential surface of the outer member 55b of the one-way clutch 55. An encoder 58b including a Hall element is provided in a position opposed to a portion of the outer circumferential surface of the magnet 58a. The encoder 58b is held on an inner surface of the second case portion 53 by a resin support member 58c. The encoder 58b detects a change in the magnetic field of the magnet 58a provided on the outer circumferential surface of the outer member 55b. In this manner, rotation of the crankshaft 41 connected with the outer member 55b is detected. In other words, the magnet 58a and the encoder 58b define a crank rotation detector 58 that detects rotation of the crankshaft 41. The crankshaft rotation detector 58 outputs a pulse signal when the encoder 58b detects a change in the magnetic field of the magnet 58a. Note that the crank rotation detector 58 outputs a pulse signal at an interval of about five degrees, for example, of the rotation angle of the crankshaft 41.

The driving force generator 60 is provided behind the crankshaft 41 in the first and second case portions 52 and 53. The driving force generator 60 includes the electric motor 61, an output shaft 81, and a gear 82.

The electric motor 61 generates a driving force used to assist the battery-assisted bicycle 1 in travelling based on a control signal output from the controller 100 that will be described. In addition, the electric motor 61 is controlled to change the driving force used to assist the battery-assisted bicycle 1 in travelling in response to an assist mode.

The electric motor 61 includes a stator 62, a rotor 63, and a rotation shaft 64. The stator 62 is fixed to the second case portion 53. The second case portion 53 is attached with a motor cover 65 to cover a left side portion of the electric motor 61. The rotation shaft 64 extends through and is fixed to the rotor 63. The rotation shaft 64 is supported rotatably at the second case portion 53 and the motor cover 65 through rolling bearings 66 and 67. A gear groove 64a is provided at a right end of the rotation shaft 64.

Although not shown, the controller 100 that will be described is provided in the vicinity of the electric motor 61. According to a preferred embodiment, the controller 100 is preferably provided near the electric motor 61, but the controller 100 may be provided at any other location.

Although not shown, the electric motor 61 is provided with a motor rotation detector 68 (see FIG. 4) used to detect rotation of the rotor 63. The motor rotation detector 68 includes an encoder to detect rotation of the rotor 63 of the electric motor 61.

As shown in FIG. 3, the output shaft 81 is supported rotatably at the main body 51 in a position behind the crankshaft 41. More specifically, the output shaft 81 is supported rotatably at the first and second case portions 52 and 53 through rolling bearings 83 and 84.

The gear 82 is provided coaxially with the output shaft 81 between the rolling bearings 83 and 84. The gear 82 engages with the gear groove 64a provided in the rotation shaft 64 of the electric motor 61. In this manner, a driving force generated at the electric motor 61 is transmitted to the gear 82 and the gear 82 is rotated. According to the present preferred embodiment, the electric motor 61 is provided so that the rotation shaft 64 turns forward. The gear 82 therefore rotates backward by the driving force transmitted from the rotation shaft 64.

A one-way clutch (motor side one-way clutch) 85 is provided between the gear 82 and the output shaft 81. The one way clutch 85 is arranged to transmit a rotation force in the backward turning direction but not in the forward turning direction from the gear 82 to the output shaft 81.

The auxiliary sprocket 43 is provided coaxially with the output shaft 81 at a right end of the output shaft 81. The auxiliary sprocket 43 and the output shaft 81 are connected with each other, for example, by a spline mechanism. In this manner, a driving force generated at the driving force generator 60 is transmitted to the auxiliary sprocket 43 from the output shaft 81. In this manner, the auxiliary sprocket 43 is turned backward.

The chain tensioner 86 is provided at a rear end of a rear end of a right side surface of the first case portion 52. As shown in FIG. 2, the chain tensioner 86 includes one end side connected to the first case portion 52 through a tension spring 87. The chain tensioner 86 has its other end side connected rotatably to the first case portion 52 by a support bolt 88. A tension sprocket 90 that is rotatable about a support bolt 89 is provided on the chain tensioner 86. The chain 46 (motive power transmission member) is wound around the tension sprocket 90 so that the tension sprocket 90 is pushed backward. Therefore, the chain 46 is adjusted to have an appropriate tension by the chain tensioner 86.

The controller 100 carries out assist control for the battery-assisted bicycle 1. As shown in FIG. 4, the controller 100 includes a pedaling effort detector 101, a motor rotation speed detector 102, an auxiliary force operator 103, a motor controller 104, a memory 105, and an assist control stopping unit 106. The structure of the controller 100 will be detailed.

FIG. 4 is a block diagram showing how signals are received/transmitted and motive power is transmitted during assist control by the electric motor 61 in the battery-assisted bicycle 1. In FIG. 4, the signal transmission/reception during assist control is designated by the broken line arrow and the motive power transmission is designated by the solid line arrow. Note that among the reference characters in FIG. 4, the same reference characters as those shown in FIGS. 1 to 3 represent the same elements in the battery-assisted bicycle 1.

Assist control in the battery-assisted bicycle 1 is achieved by controlling the driving of the electric motor 61 in response to a pedaling effort by a rider using the controller 100. More specifically, the controller 100 detects the rider's pedaling effort based on a signal output from the torque detector 57 that detects a torque at the crankshaft 41. Furthermore, the controller 100 is programmed to control the output of the electric motor 61 in response to the detected pedaling effort. The controller 100 obtains an amplitude of pedaling effort while the crankshaft 41 makes a half turn of a full rotation and stops the assist control in response to the amplitude of the pedaling effort.

As described above, the controller 100 includes the pedaling effort detector 101, the motor rotation speed detector 102, the auxiliary force operator 103, the motor controller 104, the memory 105 (storage), and the assist control stopping unit 106.

The pedaling effort detector 101 obtains a pedaling effort (torque) by a rider based on a detection result from the torque detector 57. The motor rotation speed detector 102 obtains a rotation speed of the electric motor 61 based on rotation of the electric motor 61 detected by the motor rotation detector 68.

The auxiliary force operator 103 calculates a necessary driving force (auxiliary force) from the electric motor 61 based on the pedaling effort detected by the pedaling effort detector 101. The auxiliary force operator 103 calculates a driving force from the electric motor 61 so that assist control is stopped when the assist control stopping unit 106 (that will be described) determines to stop the assist control.

Furthermore, the auxiliary force operation unit 103 calculates a driving force of the electric motor 61 according to an assist mode of the assist control. Although not described in detail, the battery-assisted bicycle 1 includes, for example, four modes including "intense," "standard," "auto-echo," and "off" depending on the requested driving force of the electric motor 61.

The motor controller 104 is programmed to control the driving of the electric motor 61 so that the necessary driving force calculated by the auxiliary force operation unit 103 is output by the electric motor 61. The motor controller 104 is programmed to control the driving of the electric motor 61 in response to the rotation speed of the electric motor 61 detected by the motor rotation speed detector 102.

The memory 105 stores the pedaling effort corresponding to a rotation angle of the crankshaft 41 detected by the crank rotation detector 58. More specifically, the memory 105 is provided with a pulse signal output from the crank rotation detector 58 as an input and with pedaling effort output from the pedaling effort detector 101. The memory 105 stores the pedaling effort in association with the pulse signal.

The memory 105 preferably stores pedaling effort for a half turn (a rotation angle of 180°) of a full rotation of the crankshaft 41 from the pedaling effort output from the pedaling effort detector 101. The pedaling effort is stored in the memory 105, for example, for about every five degrees of the rotation angle of the crankshaft 41. The memory 105 may be arranged to store a pedaling effort for 180° or more of the rotation angle of the crankshaft 41.

The memory 105 is preferably, for example, a so-called ring buffer that is theoretically connected in a circular form. Each storage region of the memory 105 stores a pedaling effort on the basis of a prescribed rotation angle of the crankshaft 41 (for every pulse signal).

Figure 9:
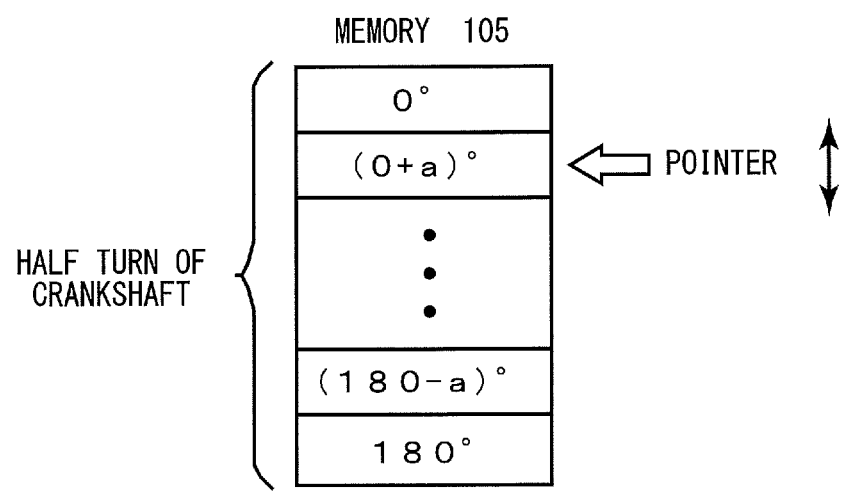
FIG. 9 is a schematic view showing a storage region in the memory in the battery-assisted bicycle.

FIG. 9 schematically shows a storage region of the memory 105. The memory 105 includes a pointer to point to a region to be written among a plurality of storage regions. When the crankshaft 41 rotates normally (the rotation when the battery-assisted bicycle 1 advances), the pointer used to write in each storage region of the memory 105 advances (the black arrow in FIG. 9). On the other hand, the pointer used to write each storage region of the memory 105 moves back (the black arrow in FIG. 9) when the crankshaft 41 rotates reversely (rotates in the opposite direction to the normal rotation). In this manner, the pedaling effort is stored in each storage region in response to a pulse signal output from the crank rotation detector 58. The memory 105 in the form of the ring buffer is always stored with new pedaling effort as the crankshaft 41 rotates. Note that in FIG. 9, a sampling interval for the pedaling effort stored in the memory 105 is "a" degree of the rotation of the crankshaft 41.

Figure 6:
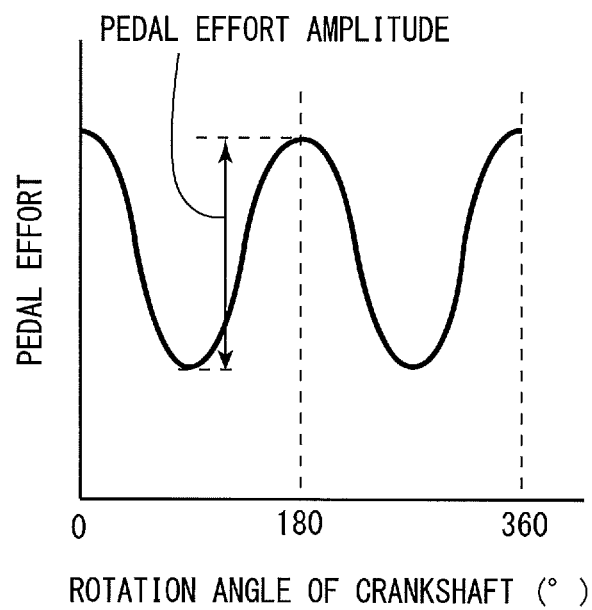
FIG. 6 shows an example of a relationship between a rotation angle of a crankshaft and pedaling effort in the battery-assisted bicycle.

The assist control stopping unit 106 is programmed to determine whether or not to stop the assist control based on a pedaling effort amplitude obtained from the pedaling effort for a half turn of a full rotation of the crankshaft 41 stored in the memory 105. Note that, as shown in FIG. 6, the pedaling effort generated at the crankshaft 41 when a rider pushes on the pedals 33 and 34 changes according to the rotation angle of the crankshaft 41.

More specifically, the assist control stopping unit 106 determines to stop assist control if the amplitude of the pedaling effort for a half turn of a full rotation of the rotation shaft 41 is not more than a predetermined threshold. In this manner, rather than based on a pedal amplitude for a prescribed time period, the assist control is stopped based on a pedaling effort amplitude for a half turn of a full rotation of the crankshaft 41, so that the assist stop determination is unaffected by the length of the prescribed time period or the rotation speed of the crankshaft 41 unlike the conventional method. In this manner, the accuracy of the assist stop determination is increased. Therefore, a rider can be prevented from feeling uncomfortable because of frequent stopping of the assist control or a time delay until the assist stops after the rider stops pushing on the pedals 33 and 34.

Figure 5:
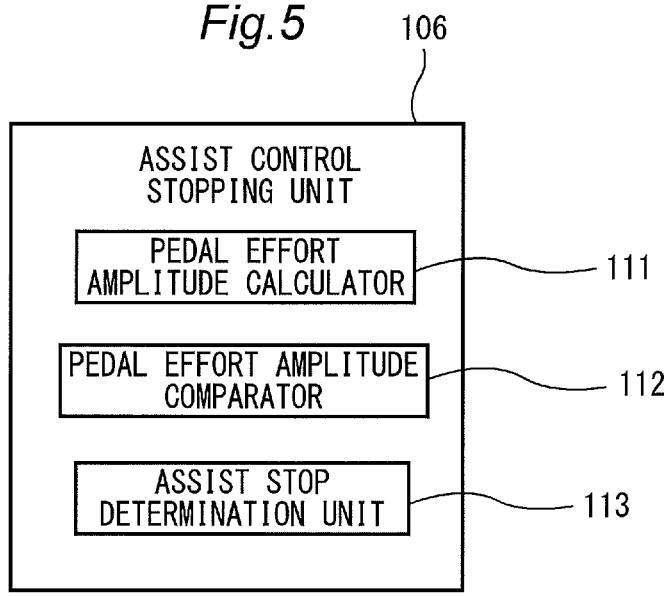
FIG. 5 is a block diagram of a general structure of an assist control stopping unit in the battery-assisted bicycle.

As shown in FIG. 5, the assist control stopping unit 106 includes a pedaling effort amplitude calculator 111 (torque amplitude calculator), a pedaling effort comparator 112, and an assist stop determination unit 113.

The pedaling effort amplitude calculator 111 obtains a pedaling effort amplitude from a maximum value and a minimum value of the pedaling effort based on a pedaling effort for a half turn (180°) of a full rotation of the crankshaft 41 stored in the memory 105. More specifically, the pedaling effort amplitude calculator 111 reads out the pedaling effort in a range from the present rotation angle of the crankshaft 41 (used as a reference angular position) to a rotation angle before 180° (a prescribed angular range) from the memory 105. The pedaling effort amplitude calculator 111 obtains a pedaling effort amplitude by calculating the difference between the maximum value and the minimum value using the read out pedaling effort.

In this manner, the pedaling effort amplitude calculator 111 calculates a pedaling effort amplitude using the pedaling effort for a rotation angle of 180° of the crankshaft 41, and therefore a more accurate pedaling effort amplitude is obtained using the minimum and maximum values of the pedaling effort included within the rotation angle of 180° as shown in FIG. 6. Furthermore, a pedaling effort amplitude is calculated using the pedaling effort for a rotation angle of 180° as described above, a more accurate pedaling effort amplitude is obtained quickly with a small calculation load as compared to the case of calculating the pedaling effort in a rotation angle range of 180° or more.

The pedaling effort amplitude comparator 112 determines whether the amplitude of the pedaling effort obtained by the pedaling effort amplitude calculator 111 is equal to or less than a threshold. The lower limit for the threshold corresponds to the fluctuation range of the output of the torque detector 57 when the crankshaft 41 makes a no-load rotation. Note that the threshold is preferably not more than the minimum pedaling effort amplitude based on which it is determined that a rider pushes on the pedals 33 and 34. The pedaling effort amplitude comparator 112 outputs a signal to the assist stop determination unit 113 if the pedaling effort amplitude obtained by the pedaling effort amplitude calculator 111 is not more than the threshold.

The assist stop determination unit 113 determines to stop assist control when the signal is output from the pedaling effort amplitude comparator 112. The assist stop determination unit 113 outputs a stop signal to the auxiliary force operator 103 upon determining to stop the assist control.

Now, in the battery-assisted bicycle 1 including the above described structure, the assist stop determination by the assist control stopping unit 106 to stop assist control will be described with reference to the flow in FIG. 7.

Figure 7:
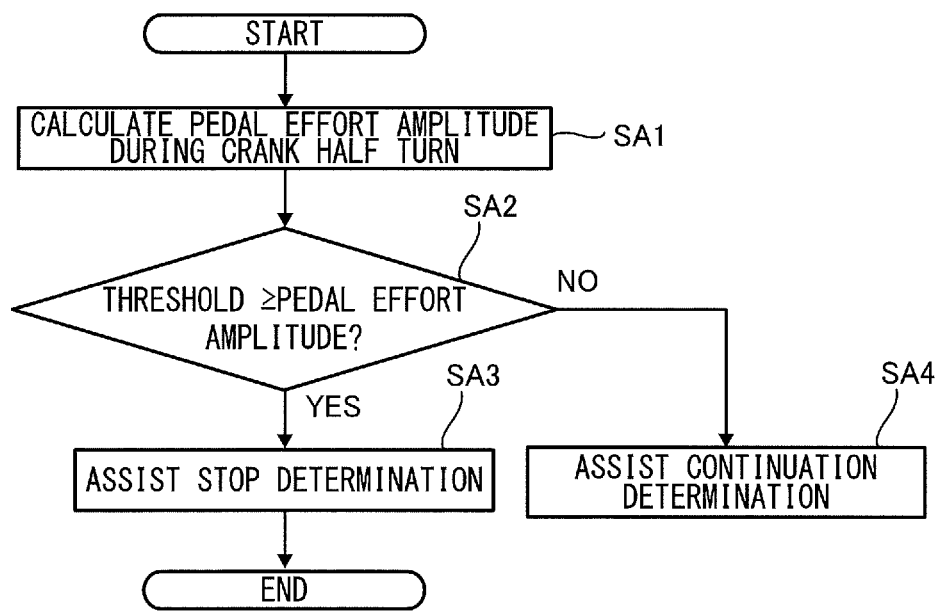
FIG. 7 is a flowchart for illustrating an assist stop determination in the battery-assisted bicycle.

When the assist stop determination flow as shown in FIG. 7 starts (START), in step SA1, a pedaling effort amplitude is calculated by the pedaling effort amplitude calculator 111 based on a pedaling effort read out from the memory 105. More specifically, in step SA1, the pedaling effort amplitude calculator 111 reads out the pedaling effort for a half turn of a full rotation of the crankshaft 41 stored in the memory 105 and calculates the difference between the maximum value and the minimum value in the pedaling effort to obtain a pedaling effort amplitude.

It is determined in the succeeding step SA2 whether the pedaling effort amplitude calculated in step SA1 is equal to or less than the threshold. If it is determined in step SA2 that the pedaling effort amplitude is equal to or less than the threshold (YES), the control proceeds to step SA3 and determination to stop assist control (assist stop determination) is carried out by the assist stop determination unit 113. On the other hand, if it is determined that the pedaling effort amplitude is more than the threshold (NO), the control proceeds to step SA4 and determination to continue assist control (assist continuation control) is carried out.

After the determination in steps SA3 and SA4, the flow ends (END).

In this manner, an amplitude is obtained from the pedaling effort for a half turn of a full rotation of the crankshaft 41 and assist stop determination is carried out based on the amplitude, so that the assist stop determination is carried out accurately without being affected by the length of a determination duration or the rotation speed of the crankshaft 41.

As described above, the memory 105 stores the pedaling effort detected by the pedaling effort detector 101 during a half turn of a full rotation of the crankshaft 41. The memory 105 is, for example, a ring buffer and stores the pedaling effort for each rotation angle (for every pulse signal output from the crank detector 58) in each storage region.

In the following, the flow for storing the pedaling effort in the memory 105 will be described with reference to FIG. 8.

Figure 8:
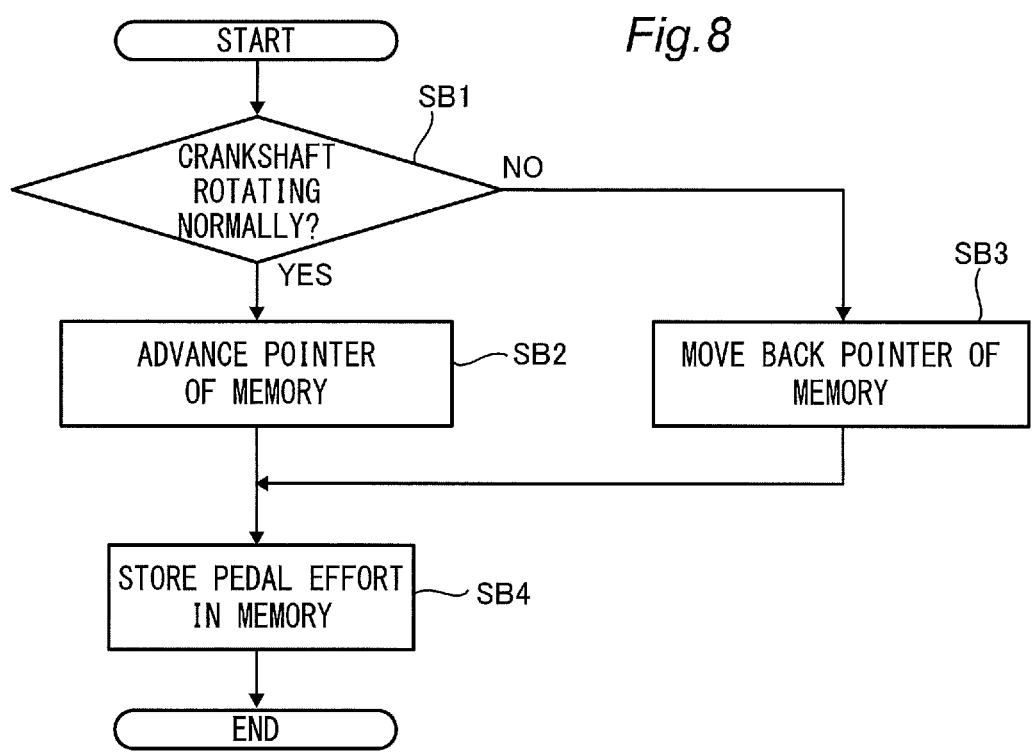
FIG. 8 is a flowchart for illustrating how pedaling effort is stored in a memory in the battery-assisted bicycle.

Note that the flow in FIG. 8 starts in response to a pulse signal output from the crank rotation detector 58.

When the flow in FIG. 8 starts (START), it is determined by the controller 100 in step SB1 whether the crank rotation 41 has rotated normally based on a detection result from the crank rotation detector 58. The normal rotation of the crank shaft 41 can be detected, for example, in consideration of the phase difference or the like of pulse signals output from the crank rotation detector 58.

If it is determined in step SB1 that the crankshaft 41 rotates normally (YES), the control proceeds to step SB2 and advances the pointer of the memory 105. On the other hand, if it is determined that the crankshaft 41 does not rotate normally (NO), the control proceeds to step SB3 and moves back the pointer of the memory 105.

After the pointer of the memory 105 is thus moved in steps SB2 and SB3, the pedaling effort is stored in a storage region where the pointer is positioned in step SB4. Then, the flow ends (END).

In this manner, the pointer position of the memory 105 is changed in response to rotation of the crankshaft 41 and the pedaling effort is stored in a storage region pointed by the pointer, so that the pedaling effort can be stored in the memory 105 according to a rotation angle of the crankshaft 41.

According to the present preferred embodiment, the battery-assisted bicycle 1 includes the crankshaft 41 to which the pedals 33 and 34 are to be connected, the torque detector 57 that detects a torque generated at the crankshaft 41, and the assist control stopping unit 106 that stops an assist control based on an amplitude of a torque detected by the torque detector 57 as the crankshaft 41 rotates in a prescribed angle range.

In this manner, assist stop determination can be carried out using an amplitude of the pedaling effort as the crankshaft 41 rotates in the prescribed angle range (a half turn of a full rotation). Therefore, a structure that allows the assist control to be stopped accurately without being affected by the length of a determination duration or the rotation speed of the crankshaft 41 is implemented.

According to the present preferred embodiment, the assist control stopping unit 106 includes the pedaling effort amplitude calculator 111 that calculates an amplitude of a torque and the assist stop determination unit 113 that determines to stop assist control if the amplitude of the torque obtained by the pedaling effort amplitude calculator 111 is not more than a threshold.

In this manner, a structure that allows the assist stop determination to be carried out using an amplitude of pedaling effort as the crankshaft 41 rotates in a prescribed angle range is implemented.

According to the present preferred embodiment, the battery-assisted bicycle 1 further includes a crank rotation detector 58 that detects a rotation angle of the crankshaft 41 and the memory 105 that stores a torque detected by the torque detector 57 for each rotation angle of the crankshaft 41 detected by the crank rotation detector 58. The pedaling effort amplitude calculator 111 is arranged to calculate the difference between the maximum value and the minimum value in a torque stored in the memory 105 as an amplitude of the torque.

In this manner, the memory 105 can store the pedaling effort obtained when the crankshaft 41 rotates in a prescribed rotation angle range, so that a pedaling effort amplitude in the prescribed rotation angle range is calculated easily. Therefore, a structure that allows the assist stop determination to be carried out using a pedaling effort amplitude obtained as the crankshaft 41 rotates in the prescribed rotation angle range is readily implemented.

According to the present preferred embodiment, the memory 105 is arranged to store a torque corresponding to the prescribed rotation angle range among torques detected by torque detector 57. In this manner, the assist stop determination is carried out based on a pedaling effort amplitude in the prescribed rotation angle range stored in the memory 105.

According to the present preferred embodiment, the lower limit for the threshold corresponds to the fluctuation range of the output of the torque detector 57 when the crankshaft 41 makes a no-load rotation. A value not less than the fluctuation range of the torque detector 57 when no torque is generated at the crankshaft 41 is preferably set as the threshold, so that a pedaling effort amplitude when no torque is generated at the crankshaft 41 can be detected more surely. Therefore, the assist control is stopped accurately.

According to the present preferred embodiment, the prescribed rotation angle range is a fixed angle range in which the phase can change. Furthermore, the phase in the prescribed rotation angle range changes in synchronization with the rotation of the pedals 33 and 34. More specifically, as the pedals 33 and 34 are rotated, a torque newly detected by the torque detector 57 is stored in the memory 105 and the oldest stored torque value is deleted. In this manner, the torque storage values in the memory 105 can always be torque values within the newest prescribed rotation angle range.

According to the present preferred embodiment, the prescribed rotation angle range preferably is 180° or more, for example. The pedaling effort (torque) includes minimum and maximum values when the rotation angle range of the crankshaft 41 preferably is 180° or more, for example. Therefore, setting the prescribed rotation angle range to 180° or more, for example, a more accurate pedaling effort amplitude is obtained. Therefore, the assist control stop determination is carried out more accurately.

OTHER PREFERRED EMBODIMENTS

Although preferred embodiments of the present invention have been described and illustrated, it is clearly understood that the same is by way of illustration and example only. The present invention is not limited to the above-described preferred embodiments, which can be modified in various forms without departing from the scope and spirit of the present invention.

According to a preferred embodiment described above, a ring buffer is preferably used as the memory 105. However, any other kind of memory may be used as long as the memory is capable of storing the pedaling effort for each rotation angle of the crankshaft 41.

While preferred embodiments of the present invention have been described above, it is to be understood that variations and modification will be apparent to those skilled in the art without departing the scope and spirit of the present invention. The scope of the present invention, therefore, is to be determined solely by the following claims.

What is claimed is:

1. A driving unit that assists a rider's pedaling effort, the driving unit comprising:
   an electric motor configured to provide a driving force to assist the rider's pedaling effort;
   a crankshaft to which pedals are to be connected;
   a torque detector configured to detect a torque generated at the crankshaft by the rider's pedaling effort; and an assist control stopping unit programmed to stop an assist control provided by the driving force from the electric motor based on an amplitude of the torque detected by the torque detector while the crankshaft rotates over a prescribed rotation angle range; wherein the assist control stopping unit includes:

a torque amplitude calculator that calculates an amplitude of the torque, the amplitude of the torque being defined as a difference between a maximum value and a minimum value of the torque detected by the torque detector over the prescribed rotation angle range; and an assist stop determination unit that determines to stop the assist control if the amplitude of the torque obtained by the torque amplitude calculator is equal to or less than a predetermined threshold.

2. The driving unit according to claim 1, wherein the prescribed rotation angle range is a fixed range.

3. The driving unit according to claim 2, wherein a start and an end of the prescribed rotation angle range changes in synchronization with rotation of the pedals.

4. The driving unit according to claim 1, further comprising:

a crank rotation detector that detects a rotation angle of the crankshaft; and a storage that stores the torque detected by the torque detector for each rotation angle of the crankshaft detected by the crank rotation detector; wherein the torque amplitude calculator is arranged to calculate the difference between the maximum value and the minimum value of the torque stored in the storage.

5. The driving unit according to claim 4, wherein the storage is arranged to store the torque corresponding to the prescribed rotation angle range.

6. The driving unit according to claim 1, wherein a lower limit of the predetermined threshold corresponds to a fluctuation range of an output of the torque detector when the crankshaft makes a no-load rotation in which no torque is generated at the crankshaft.

7. The driving unit according to claim 1, wherein the prescribed rotation angle range is at least 180°.

8. A battery-assisted bicycle including the driving unit according to claim 1.

* * * * *